United States Patent
Butler et al.

(10) Patent No.: US 8,559,440 B2
(45) Date of Patent: *Oct. 15, 2013

(54) MERGING MULTIPLE NETWORK DATA FLOWS

(75) Inventors: Duane M. Butler, Anoka, MN (US); Mike Conner, Maple Grove, MN (US); Christopher T. Bernard, Wayzata, MN (US); Christopher D. Koch, Minneapolis, MN (US)

(73) Assignee: Calix, Inc., Petaluma, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/908,559

(22) Filed: Oct. 20, 2010

(65) Prior Publication Data

US 2011/0032951 A1 Feb. 10, 2011

Related U.S. Application Data

(63) Continuation of application No. 12/258,908, filed on Oct. 27, 2008, now Pat. No. 7,843,939, which is a continuation of application No. 10/857,349, filed on May 28, 2004, now Pat. No. 7,586,920.

(60) Provisional application No. 60/474,487, filed on May 30, 2003.

(51) Int. Cl.
H04L 12/28 (2006.01)
H04J 3/24 (2006.01)

(52) U.S. Cl.
USPC .......................... 370/395.3; 370/474

(58) Field of Classification Search
USPC ........... 370/394, 395.1, 397, 399, 395.3, 409, 370/474
See application file for complete search history.

(56) References Cited

U.S. PATENT DOCUMENTS

| | | | |
|---|---|---|---|
| 5,541,926 A | | 7/1996 | Saito et al. |
| 5,715,250 A | * | 2/1998 | Watanabe ................ 370/395.53 |
| 5,883,893 A | * | 3/1999 | Rumer et al. ............. 370/395.6 |
| 5,917,828 A | | 6/1999 | Thompson |
| 6,553,014 B1 | | 4/2003 | Shobatake |

(Continued)

OTHER PUBLICATIONS

Interview Summary for U.S. Appl. No. 10/857,349, dated Feb. 12, 2009, 2 pages.

(Continued)

*Primary Examiner* — Hong Cho
(74) *Attorney, Agent, or Firm* — Shumaker & Sieffert, P.A.

(57) ABSTRACT

The disclosure presents techniques for merging multiple data flows in a network such as a Passive Optical Network (PON). The PON comprises an interface module and network nodes connected to the interface module via an optical fiber link. Each network node further serves client devices. The client devices request multiple data flows, requiring the interface module to serve multiple data flows to a network node for delivery to the devices. The interface module merges received data flows to permit multiple flows to be processed by a single segmentation and reassembly (SAR) engine, reducing hardware cost and complexity within the node. However, subunits associated with different data flows within a merged data flow are not interleaved with one another. Instead, the subunits associated with an original unit of information are transmitted contiguously within the merged data flow, facilitating identification and reassembly of the subunits for a particular microflow.

31 Claims, 6 Drawing Sheets

(56) References Cited

U.S. PATENT DOCUMENTS

| | | | |
|---|---|---|---|
| 6,625,123 | B1 | 9/2003 | Fukumoto et al. |
| 6,788,690 | B2 | 9/2004 | Harri |
| 6,879,590 | B2 * | 4/2005 | Pedersen et al. ............... 370/394 |
| 7,032,224 | B2 * | 4/2006 | Kadakia et al. ............... 719/313 |
| 7,072,302 | B1 | 7/2006 | Storr |
| 7,272,143 | B2 | 9/2007 | Shobatake |
| 7,277,637 | B2 * | 10/2007 | Jette et al. ....................... 398/70 |
| 7,286,566 | B1 | 10/2007 | Parruck et al. |
| 7,586,920 | B2 | 9/2009 | Butler et al. |
| 7,843,939 | B2 | 11/2010 | Butler et al. |
| 2002/0080821 | A1 | 6/2002 | Hwang |

OTHER PUBLICATIONS

Office Action for U.S. Appl. No. 10/857,349, dated Mar. 3, 2009, 11 pages.
Response to Office Action for U.S. Appl. No. 10/857,349, filed Mar. 16, 2009, 28 pages.
Office Action for U.S. Appl. No. 12/258,908, dated Jan. 28, 2010, 2009, 7 pages.
Response to Office Action for U.S. Appl. No. 12/258,908, filed Apr. 28, 2010, 17 pages.
Final Office Action for U.S. Appl. No. 12/258,908, dated May 12, 2010, 2009, 9 pages.
Response to Final Office Action for U.S. Appl. No. 12/258,908, filed Jul. 9, 2010, 18 pages.

* cited by examiner

MERGING MULTIPLE NETWORK DATA FLOWS

This application is a continuation of U.S. application Ser. No. 12/258,908, filed Oct. 27, 2008, which is a continuation of U.S. application Ser. No. 10/857,349, filed May 28, 2004, now U.S. Pat. No. 7,586,920, which claims the benefit of U.S. provisional application no. 60/474,487, filed May 30, 2003, the entire content of each of which is incorporated herein by reference.

TECHNICAL FIELD

The invention relates to computer networking and, more particularly, to the delivery of multiple flows of data within a passive optical network (PON).

BACKGROUND

A passive optical network (PON) delivers voice, video and other data among multiple network nodes using a common optical fiber link. Passive optical splitters and combiners enable a number of network nodes to share the optical fiber link. Each network node terminates the optical fiber link for a residential or business subscriber, and is sometimes referred to as a subscriber premises node. A PON typically includes a PON interface having multiple, independent PON interface modules serving multiple optical fiber links In particular, each PON interface module provides an interface for transmission and reception of data over a particular optical fiber link that serves a group of network nodes.

Typically, both the PON interface and each of the network nodes include one or more segmentation and reassembly (SAR) engines. A SAR engine within the PON interface receives units of data, such as Internet packets, telephone voice data, cable television data and the like, segments the units of data into smaller subunits, e.g., ATM Adaptation Layer-5 (AAL-5) cells, and bounds the subunits into bounded units, such as frames, to preserve the data. A SAR engine within a network node reassembles the subunits into the original units of data once the last of the bounded subunits arrives, thereby reconstructing the original flow of data for delivery to devices served by the network node.

Generally, a SAR engine is required for each microflow. A microflow refers a flow of data that can be uniquely identified by lower level identifiers, e.g., ATM Virtual Path Identifier (VPI)/Virtual Channel Identifier (VCI) pairs. For example, a microflow can carry data for a single cable television channel, a telephone exchange, an Internet connection, or the like. A PON interface typically includes multiple SAR engines to concurrently provide data from multiple microflows. A network node may similarly include multiple SAR engines to handle each of several concurrently requested microflows. However, the need for multiple SAR engines increases the complexity and cost associated with each network node.

Various techniques have been developed to address the high complexity and cost associated with PON networks. For example, some PON interfaces and network nodes have been designed to implement merging techniques, such as virtual channel (VC)-merge. VC-merge is a technique that involves merging the units of information from multiple microflows into a common flow. According to the VC-merge technique, a SAR engine in a PON interface interleaves units of information having different source microflows. In particular, a SAR engine implementing VC-merge may interleave subunits from different source microflows within a common bounded unit. In the AAL-5 example, the subunits are cells and the bounded unit is a frame. Because the microflows are merged into a common flow, the network nodes only require a single SAR engine to receive all of the microflows.

Although VC-merge techniques may reduce the complexity of the network nodes, using a common flow generally prevents the use of conventional traffic metering mechanisms that rely on lower level identifiers, such as ATM traffic metering mechanisms. Also, with a common flow, the units of information share a common VPI/VCI identifier. Therefore, in order to select desired units of information, network nodes must rely on higher level identifiers to identify the microflows and reassemble the corresponding original units of information. However, various units of information, such as MPEG-2 packets, may not provide higher level identifiers.

In these instances, a single SAR engine may be unable to resolve the source of a unit of information and thus cannot distinguish between different microflows for purposes of accepting or rejecting individual units of information. In the event the network node is configured to accept all unknown units of information, the network node can quickly overflow with information, which in turn leads to network inefficiencies. On the other hand, if the network node is configured to reject all unknown units of information, these and other types of information lacking higher level identifiers will be unavailable to subscribers.

SUMMARY

In general, the invention is directed to techniques for merging multiple data flows in a Passive Optical Network (PON). The PON comprises an interface module and a plurality of network nodes connected to the interface module via an optical fiber link. Each of the network nodes further serves client devices at a host site. The client devices may request multiple data flows, requiring the interface module to serve multiple data flows to a network node for delivery to the devices.

As will be described in further detail, the interface module merges received data flows, allowing for reduced cost and complexity in hardware residing within the network node. In the exemplary context of ATM Abstraction Layer-5 (AAL-5) cells, for example, multiple flows can be processed by a single segmentation and reassembly (SAR) engine, reducing hardware cost and complexity within the node. However, subunits associated with different data flows within a merged data flow are not interleaved with one another. Instead, the subunits associated with an original unit of information are transmitted contiguously within the merged data flow, facilitating identification and reassembly of the subunits for a particular microflow.

In one embodiment, the invention provides a method comprising assigning a first identifier to a first unit of information and a second identifier to a second unit of information, wherein the identifiers identify flows associated with the respective units of information, segmenting each of the units of information into a plurality of subunits, appending the respective identifier for each of the units of information to each of the corresponding subunits, and storing the subunits in a common output queue such that the subunits for the first unit of information are not interleaved with the subunits for the second unit of information.

In another embodiment, the invention provides a method comprising receiving a set of first information subunits and a set of second information subunits, each of the first information subunits including a first identifier that identifies a first flow associated with the first subunits, and each of the second information subunits including a second identifier that identifies a second flow associated with the second subunits, converting the first and second identifiers to a common identifier, and reassembling the first information subunits to form a first unit of information, and reassembling the second information subunits to form a second unit of information.

In an added embodiment, the invention provides a method comprising assigning an identifier to a unit of information, wherein the identifier identifies a flow associated with the unit of information, segmenting the unit of information into a plurality of subunits, appending the identifier to each of the plurality of subunits to form a bounded unit, transmitting single subunits forming part of the bounded unit contiguously, such that subunits of different bounded units are not interleaved, receiving the bounded unit, converting the identifier of each of the subunits into a common identifier, and reassembling the plurality of subunits to form the unit of information.

In another embodiment, the invention provides an interface module for a passive optical network, the interface module comprising an assignment module to assign a first identifier to a first unit of information and a second identifier to a second unit of information, wherein the identifiers identify flows associated with the respective units of information, a segmentation module to segment each of the units of information into a plurality of subunits, and incorporate the respective identifier for each of the units of information in each of the corresponding subunits, and an output queue to store the subunits such that the subunits for the first unit of information are not interleaved with the subunits for the second unit of information.

In a further embodiment, the invention provides a passive optical network node comprising a filter module to selectively receive a set of first information subunits and a set of second information subunits, each of the first subunits including a first identifier that identifies a first flow associated with the first subunits, and each of the second subunits including a second identifier that identifies a second flow associated with the second subunits, a conversion module to convert the first and second identifiers of each of the first and second subunits into a common identifier, and a reassembly engine to reassemble the first subunits of information to form a first unit of information, and reassemble the second subunits of information to form a second unit of information.

In some embodiments, the units of information are packets and the subunits are ATM cells. In this case, the subunits for the first and second units of information may be transmitted as ATM cells within a common ATM frame that, in effect, merges the flows. However, the cells for the first unit of information are transmitted contiguously within the ATM frame such that they are not interleaved with cells for the second unit of information. Also, the method may include segmenting the units of information using an AAL-5 SAR engine.

The use of a common, or "uniform" identifier, for multiple flows permits multiple flows to be processed using a single SAR context, reducing hardware overhead. As an example, the common identifier may be a VPI/VCI combination. The first and second units of information include higher level identifiers for identification of the flows independently of the first and second identifiers. The method may include reassembling the information subunits using an AAL-5 SAR engine.

The invention may provide one or more advantages. In accordance with the invention, a network node on a PON can receive multiple microflows of information. In the AAL-5 example, the network node can receive multiple microflows of data identified by respective VPI/VCI combinations without the need for separate AAL-5 SAR contexts. In other words, multiple microflows can be handled using only a single, common AAL-5 SAR engine, rather than a separate AAL-5 SAR engine for each microflow. This technique is advantageous because it does not require the use of higher-layer discriminators in the ATM payload, and generally requires less logic at the receiver node than nodes employing multiple SAR engines.

Also, multiple microflows are merged into a common queue at a PON interface module, but still sent with the originally assigned VPI/VCI pair information unique to the individual microflows through the downstream PON ATM network. In other words, subunits, e.g., ATM cells, in each microflow retain their original VPI/VCI information. Thus, contrary to conventional merging techniques, such as VC-merge, the subunits are not sent through the network with a common VPI/VCI. Retaining the original, individualized VPI/VCI information has traffic loading implications, because traffic on an ATM network can still use the ATM traffic metering mechanisms that are reliant on VPI/VCI independence, thereby avoiding increases in the cost of memory and logic at the receiver node.

In addition, it is not necessary for the receiver node to receive all merged traffic on a common VPI/VCI and parse at a higher level. Instead, the flows can still be differentiated at the original VPI/VCI level. In accordance with the invention, the interface module ensures that subunits associated with a particular bounded unit of information are sent contiguously and not interleaved with subunits for other bounded units of information.

The receiver node then reassembles the sub-units and re-maps the individual VPI/VCI identifiers to a common, i.e., "uniform," identifier to enable processing of subunits from separate bounding units, e.g., frames, of information within a single SAR context. Eliminating the need for higher level parsing allows the network nodes to accept all content types, including those lacking higher level identifiers, such as MPEG-2 packets, and also prevents overflow that may result from merging all traffic to a common VPI/VCI identifier prior to sending the information to the network nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
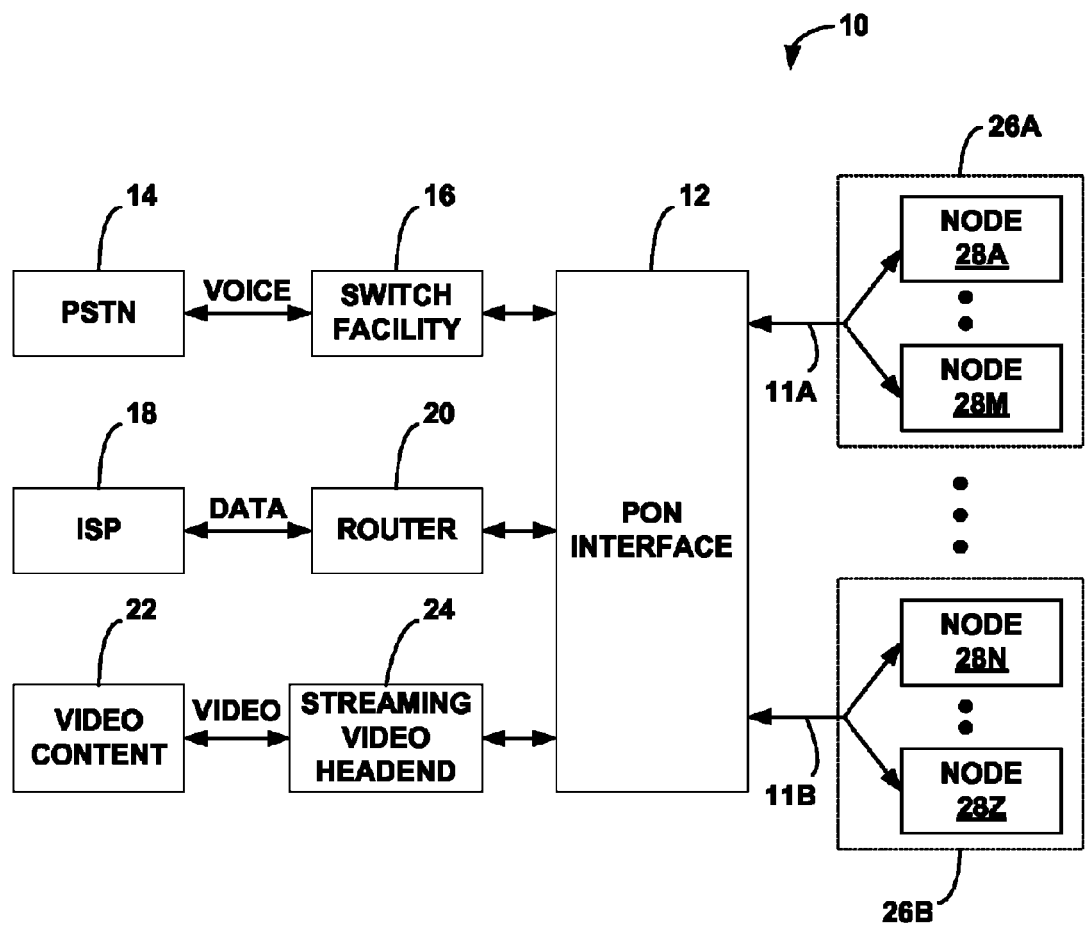
FIG. 1 is a block diagram illustrating a passive optical network (PON).

FIG. 1 is a block diagram illustrating a passive optical network (PON) 10. As shown in FIG. 1, PON 10 can be arranged to deliver voice, data and video content (generally "information") to a number of network nodes via a plurality of optical fiber links. FIG. 1 depicts two optical fiber links 11A and 11B for purposes of illustration. Exemplary components for implementing a PON are commercially available from Optical Solutions, Inc., of Minneapolis, Minn., and designated by the tradename Fiberpath 400™, including the Fiberdrive™ headend bay interface and the Fiberpoint™ subscriber premise nodes.

A PON interface 12 may receive voice information, for example, from the public switched telephone network (PSTN) 14 via a switch facility 16. In addition, PON interface 12 may be coupled to one or more Internet service providers (ISP's) on Internet 18 via a router 20. As further shown in FIG. 1, PON interface 12 may receive video content 22 from video content suppliers via a streaming video headend 24. In each case, PON interface 12 receives the information, and distributes it along optical fiber links 11A, 11B (collectively, "optical fiber links 11") to groups 26A, 26B (collectively, "groups 26") of network nodes 28A-28M and 28N, 28Z (collectively, "network nodes 28"). Each group 26 is coupled to a particular one of optical fiber links 11.

Network nodes 28 include hardware for receiving information from PON 10 via optical fiber links 11, and delivering the information to one or more devices within a local area network (LAN) associated with the node. For example, each network node 28 may serve as a PON access point for one or more computers, network appliances, televisions, set-top boxes, wireless devices, or the like. PON interface 12 may be located near or far from groups 26. In some existing networks, however, PON interface 12 may reside in a central office situated within approximately ten miles from each of network nodes 28.

Network nodes 28 may be located at any of a variety of locations, including residential or business sites. In addition, a single one of network nodes 28 may operate on a shared basis to deliver information to two or more closely located residences or businesses via copper or additional optical fiber connections, either directly or via a network hub, router or switch. A group 26 of network nodes 28 may refer to nodes served by PON interface 12 via a common optical fiber link 11. Each group 26 in FIG. 1 contains two network nodes 28 for purposes of illustration. However, a group 26 may include a single network node 28, or numerous network nodes 28.

Network nodes 28 also may include hardware for transmitting information over PON 10. For example, a network node 28 may transmit voice information over PSTN 14 via PON interface 12 and switch facility 16 in the course of a telephone conversation. In addition, network nodes 28 may transmit data to a variety of network nodes on the Internet via ISP 18, router 20 and PON interface 12. Multiple network nodes 28 typically transmit upstream over a common optical fiber link 11 using time division multiplexing techniques. Downstream transmission from PON interface 12 to network nodes 28 is multicast in nature.

As described herein, PON 10 comprises a multicast network where information is broadcast to all of network nodes 38 on a given optical fiber link 11. In particular, PON 10 may comprise an ATM multicast network, wherein both PON interface 12 and network nodes 28 comply with ATM Abstraction Layer 5 (AAL-5) specifications. As such, PON interface 12 and network nodes 28 typically comprise one or more segmentation and reassembly (SAR) engines (not shown in FIG. 1) to form and bound ATM cells in accordance with the AAL-5 specification. For example, ATM cells may be transmitted within an ATM frame. PON interface 12 and network nodes 28 exchange information by broadcasting the bounded units of ATM cells. PON 10 may include other networks and may conform to other specifications. For ease of illustration, however, PON 10 is discussed herein within the context of an ATM network and AAL-5 specifications.

In accordance with the invention, PON interface 12 receives units of information, as described above, from one or more microflows. A microflow represents a flow of data that can be uniquely identified by lower level identifiers, e.g., ATM Virtual Path Identifier (VPI)/Virtual Channel Identifier (VCI) pairs, and can include a single cable television channel, a telephone exchange, an Internet connection, or the like. PON interface 12 segments the units of information into subunits, e.g., ATM cells, bounds the subunits, e.g., in an ATM frame, and places the bounded subunits on a common queue so as not to interleave bounded subunits corresponding to different microflows. PON interface 12 then broadcasts the bounded subunits stored in the common queue downstream to network nodes 28 via respective optical fiber links 11.

Network nodes 28 determine whether to accept the broadcasted bounded subunits based on lower level identifiers, such as VPI/VCI pairs associated with the subunits. Network nodes 28, upon accepting a bounded subunit, reassign a common lower level identifier to all of the subunits of the bounded subunit, reassemble the subunits to form the original unit of information, and broadcasts the unit of information to all connected subscriber devices, e.g., computers, routers, set-top boxes, and the like. In this manner, a network node 28 may reduce the complexity required to process bounded subunits from different microflows.

In particular, network node 28 does not require as many SAR engines since all accepted bounded subunits are reassigned to a common lower level identifier, which a single SAR engine can process. To further reduce complexity, PON interface 12 does not interleave subunits from different microflows within a bounded subunit. By not interleaving subunits, the SAR engines of network nodes 28 do not need to rely on higher level identifiers in order to properly reassemble the original units of information. Moreover, this allows network nodes 28 to accept all information types, including MPEG-2 packets or other packets that lack higher level identifiers, without increasing the likelihood of overflow, because lower level identifiers can be used to accept bounded subunits.

Figure 2:
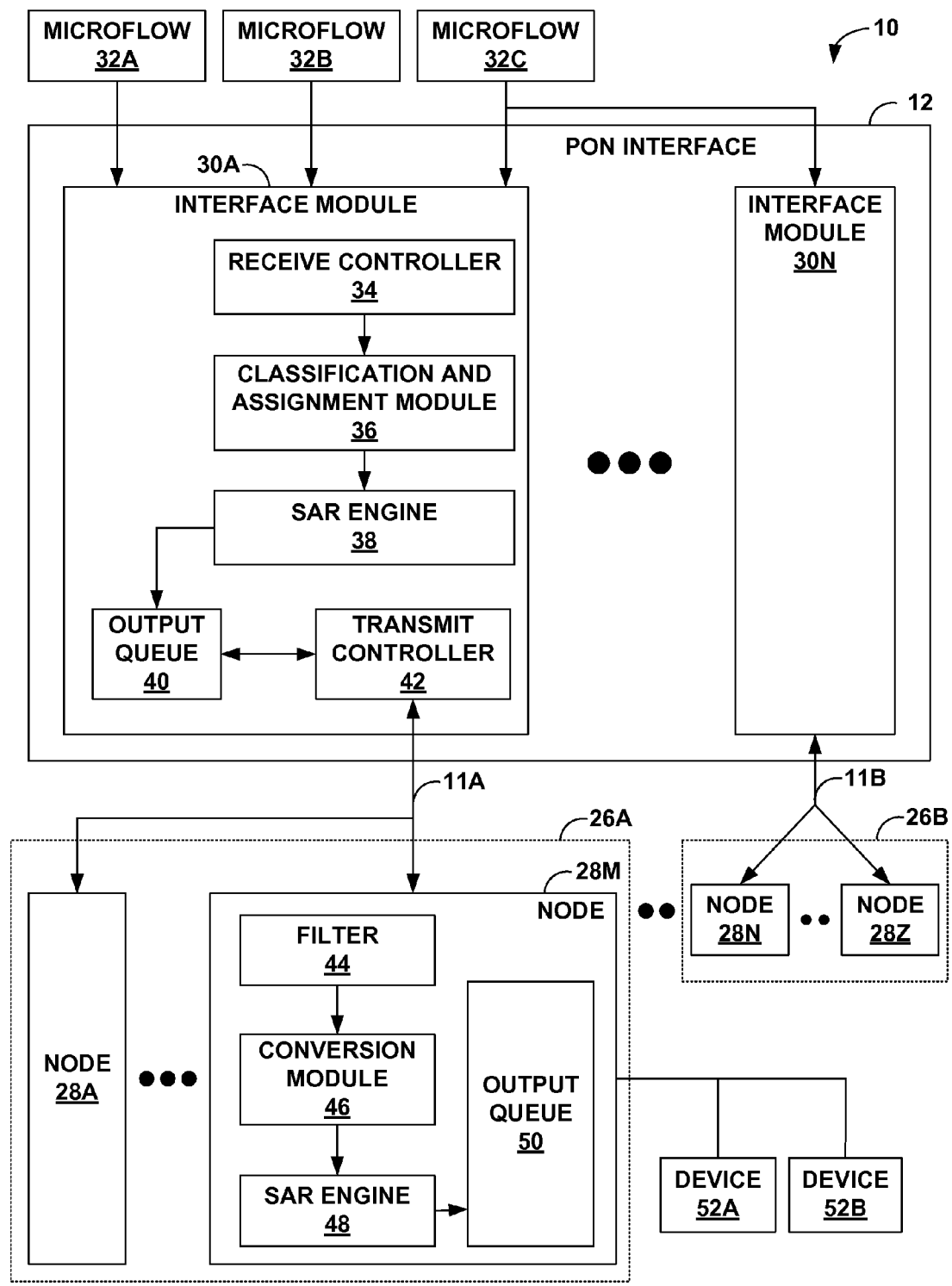
FIG. 2 is a block diagram illustrating an exemplary PON implementing a technique for merging multiple data flows in accordance with an embodiment of the invention.

FIG. 2 is a block diagram illustrating PON 10 of FIG. 1 in more detail. As shown in FIG. 2, PON interface 12 includes interface modules 30A-30N (collectively, "interface modules 30") that receive units of information from one or more of microflows 32A-32C (collectively, "microflows 32"). While shown to contain multiple interface modules 30, PON interface 12 may include a single interface module or multiple interface modules. Further, as shown in FIG. 2, PON interface 12 includes an interface module 30 for each one of optical fiber links 11. In some embodiments, however, one of interface modules 30 may serve more than one of optical fiber links 11 or two or more of interface modules 30 may serve a single one of optical fiber links 11.

Each of interface modules 30 is coupled to one of groups 26 of network nodes 28 via a respective one of optical fiber links 11. Interface module 30A, as shown in FIG. 2, includes a receive controller 34 to receive units of information from microflows 32, a classification and assignment module 36 to classify and assign an identifier, e.g., a VPI/VCI pair, to the unit of information, and a Segmentation and Reassembly (SAR) engine 38 to segment the unit of information into subunits, e.g., ATM cells, and bound the subunits. SAR engine 38 also receives bounded subunits from network nodes 28 and reassembles the bounded subunits into the original units of information.

Interface module 30 also includes an output queue 40 to store bounded subunits generated by SAR engine 38 and a transmit controller 42 to coordinate transmission of the bounded subunits stored in output queue 40 downstream to network nodes 28 via optical fiber links 11. While not explicitly shown in FIG. 2, interface modules 30B-30N may be similar to interface module 30A and may include receive controllers, transmit controllers, classification and assignment modules, output queues and SAR engines similar to those of interface module 30A.

Each group 26 of network nodes 28 receives bounded subunits from a respective one of interface modules 30 and process the bounded subunits in accordance with AAL-5 specifications. Accordingly, network node 28M, for example, includes a filter module 44, a conversion module 46, a SAR engine 48 and an output queue 50 to facilitate processing the bounded subunits. Filter module 44 allows network node 28M to filter bounded subunits from microflows that devices 52A and 52B (collectively, "devices 52") have not requested. In particular, filter module 44 identifies desired subunits on optical fiber link 11, e.g., based on VPI/VCI identifiers, and accepts the identified subunits for processing within node 28M.

Conversion module 46 receives the accepted bounded subunits from filter module 44 and reassigns the lower level identifiers associated with the accepted bounded subunits to a common lower level identifier. In this manner, network node 28M accepts subunits identified by different VPI/VCI identifiers, and hence different flows, but converts all of the accepted subunits to a common VPI/VCI identifier to permit the use of a single SAR engine. This is in contrast to the multiple SAR engines that otherwise would be necessary to handle subunits with different VPI/VCI identifiers.

SAR engine 48 reassembles the bounded subunits to form the original unit of information as received by interface module 30A. Output queue 50 stores the original unit of information until network node 28M can transmit the original unit of information to devices 52. While not explicitly shown in FIG. 2, network nodes 28A-28L and 28N-28Z may be similar to network node 28M and may include similar filters, conversion modules, SAR engines and output queues.

As described herein, PON 10 may utilize cell-switching technology, such as asynchronous transfer mode (ATM) technology, which segments units of information into cells and may group cells to form bounded cell units of information corresponding to the original unit of information. Interface module 30A, for example, of PON interface 12 receives units of information from one or more of microflows 32. Each of microflows 32 may be identified by a distinct Virtual Path Identifier (VPI)/Virtual Channel Identifier (VCI) pair in accordance with AAL-5.

Receive controller 34 receives units of information, such as Internet Engineering Task Force (IETF)-defined Internet Protocol (IP) packets, MPEG-2 packets (e.g., 188 MPEG-2 TC packets), IEEE 802.3 Ethernet frames, or the like, from microflows 32 and transfers the units of information to classification and assignment module 36. Classification and assignment module 36 classifies the units of information and assigns a lower level identifier, e.g., a distinct VPI/VCI pair, to the units of information based on the classification. For example, classification and assignment module 36 may classify received information using a higher-level identifier, such as a media access control (MAC) address or program identifier (PID), as originating from microflow 32A and assign the information a distinct VPI/VCI identifier pair using an associated map function. A broadcast map function may use the classification as an index into a table, returning the distinct VPI/VCI identifier pair associated with microflow 32A.

Next, SAR engine 38 segments each unit of information into a plurality of subunits, e.g., 53-byte ATM cells, and bounds the cells. In accordance with AAL-5 specifications, SAR engine 38 may form the bounded cell unit by inserting the lower level identifier before each cell of the bounded cell unit and further setting a Payload Type Identifier (PTI) associated with each cell included within the bounded cell unit. The PTI is a single bit and SAR engine 38 sets the bit to indicate the end of the bounded cell unit. For example, SAR engine 38 may set the PTI bit to 0 to indicate that the cells are beginning or middle cells of the bounded cell unit. To indicate the final cell of the bounded cell unit, SAR engine 38 may set the PTI bit of the last cell to 1. In this manner, bounded cell units may permit different microflows to be distinguished among cells sent with a common VPI/VCI identifier. Other status and error correction data may also precede and follow the bounded cell unit to indicate various statuses and ensure accurate transmission of the bounded cell unit.

After bounding the cells, SAR engine 38 stores the bounded cell units, including the bounding information, to output queue 40, such that none of the bounded cell units are interleaved with any other bounded subunits. Also, in contrast with conventional interface modules, output queue 40 stores bounded cell units regardless of the lower level identifier associated with each bounded cell unit. In this manner, cells for a respective microflow remain intact as a continuous set of cells in a bounded cell unit. In other words, output queue 40 is a common output queue and is not limited to storing bounded cell units corresponding to a particular lower level identifier.

Transmit controller 42 monitors output queue 42 for cells to broadcast downstream to network nodes 28. Once SAR engine 38 writes bounded cell units to output queue 40, transmit controller 42 begins to schedule the bounded cell units for transmission downstream. Transmit controller 42 may schedule the bounded cell units such that higher priority cell units are broadcasted before lower priority bounded cell units. For example, transmit controller 42 may determine priority based on the time of a request for certain information, wherein requests with an earlier time stamp have a higher priority. Because the cells produced by segmentation of a particular unit of information are stored contiguously, transmit controller 42 transmits the cells of the bounded cell units consecutively such that they are not interleaved with cells corresponding to other bounded cell units.

Network node 28M sets filter module 44 to receive particular bounded cell units from interface module 30A. For example, filter module 44 is configured to identify cells bounded by particular identifiers, such as particular VPI/VCI pairs. Network node 28M will not process cells bounded by VPI/VCI combinations that do not match the particular VPI/VCI pairs specified by filter module 44. Network node 28M further sets filter module 44 according to requests made by devices 52. Thus, if device 52A requests information from microflow 32A, network node 28M sets filter module 44 to accept cells bounded by the VPI/VCI pair associated with microflow 32A.

By maintaining associations between microflows and VPI/VCI combinations, interface module 34 provides a way for network nodes 28 to determine the particular microflows 32 from which the cells originated so that network nodes 28 can obtain the pertinent bounded cell units from PON 10. Network nodes 28 may store the associations to a memory (not shown) in the form of a table, list, indexed list or any other such data structure.

Network node 28M may set filter module 44 to accept multiple identifiers, such as multiple VPI/VCI combinations, so that multiple microflows can be accessed by devices 52. However, conversion module 46 converts the multiple VPI/VCI combinations into a common VPI/VCI combination. In this manner, a single SAR engine, i.e., SAR engine 48 in FIG. 2, may reassemble bounded cell units associated with each of the multiple VPI/VCI combinations. Without conversion module 46, network node 28M would require a separate SAR engine for each of the multiple VPI/VCI combinations, because a single SAR engine can only process a single VPI/VCI combination. Thus, conversion module 46 eliminates the need for redundant SAR engines, thereby reducing complexity while providing functionality to process cells bounded by multiple VPI/VCI combinations. In summary, filter module 44 is able to accept subunits identified by different VPI/VCI combinations for node 28M, but conversion module 46 then converts the different VPI/VCI combinations into a common VPI/VCI combination so that a single SAR engine 48 can be used.

SAR engine 48 reassembles the bounded cell units into the original units of information, e.g., packets. In some instances, the bounded cell units originate from different microflows. Thus, each bounded cell unit may be bounded by a different VPI/VCI combination prior to conversion by conversion module 46. Conversion module 46 disassociates the bounded cell units from the distinct VPI/VCI combinations associated with microflows 32 by converting the distinct VPI/VCI combinations into a uniform VPI/VCI combination. Hence, network node 28M obtains cells associated with particular microflows from the PON based on the VPI/VCI combinations carried by the cells, reassigns a common or "uniform" VPI/VCI combination to each subunit, and then applies SAR engine 48 to reassemble the cells into the corresponding units of information.

Although the original VPI/VCI combinations carried by the bounded cell unit is lost, i.e., replaced by the uniform VPI/VCI combination, the original VPI/VCI is no longer needed by network node 28M or devices 52 coupled to network node 28M. SAR engine 48 does not need to propagate the original VPI/VCI combinations to devices 52, because the devices can utilize higher-level identifiers found within the unit of information, i.e., the packet, such as a MAC address or program identifier (PIDs) or IP address, to determine whether to accept the unit of information. Yet, those higher level identifiers need not be initially evident from the merged microflows. Rather, the VPI/VCI for each microflow remains intact, and can be observed by filter module 44 in order to accept desired information units at network node 28. Again, cells within a bounded cell unit represent contiguous cells for a given microflow.

Thus, SAR engine 48 writes only the reassembled unit of information and does not write any bounding information to output queue 50. Network node 28M then broadcasts the reassembled unit of information stored in output queue 58 to devices 52. Again, devices 52 simply use the higher-level identifiers carried by the unit of information, as described above, to determine whether to accept the reassembled unit of information.

Figure 3:
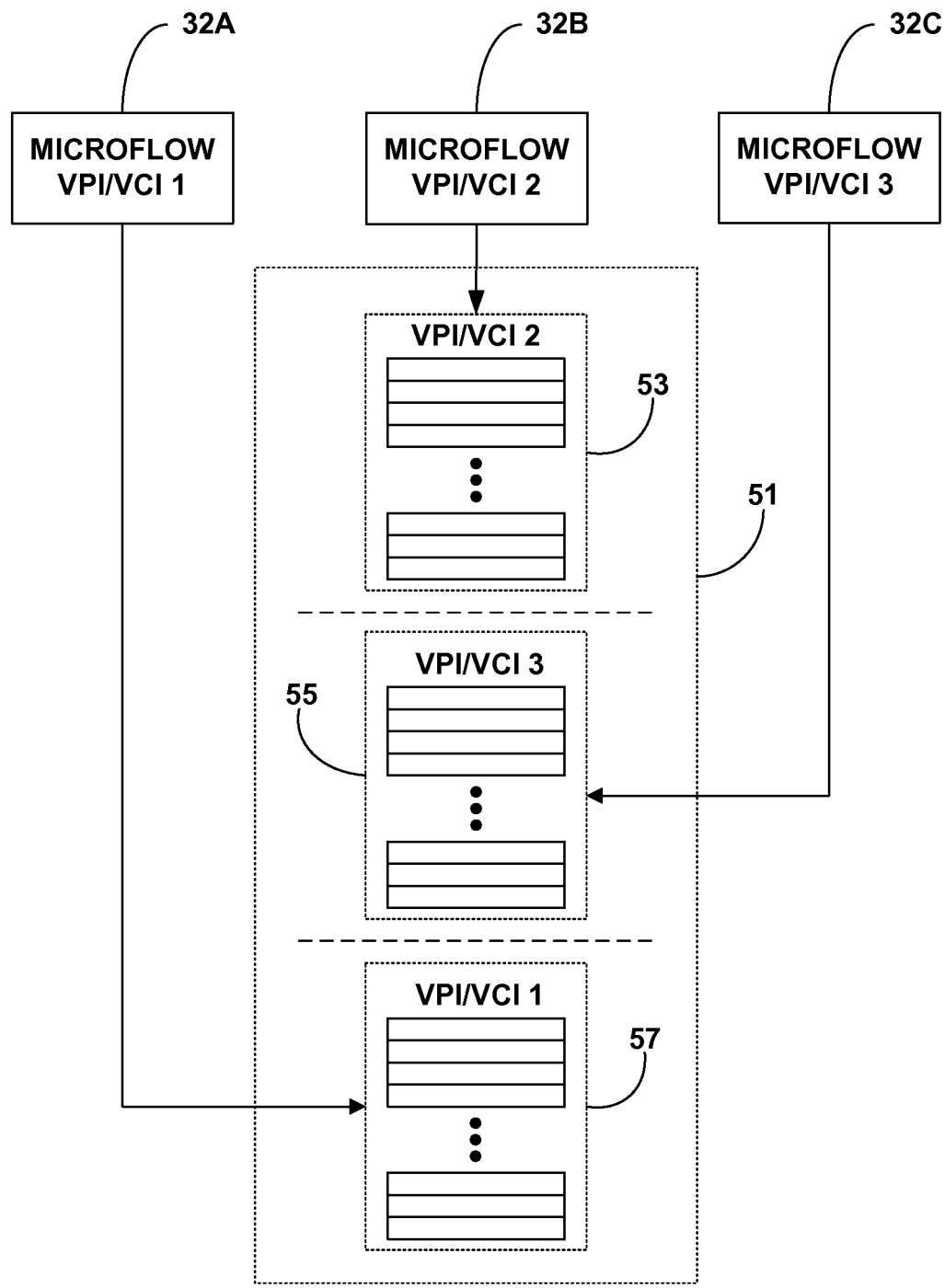
FIG. 3 is a block diagram further illustrating a technique for merging multiple data flows.

FIG. 3 is a block diagram further illustrating a technique for merging multiple data flows. In particular, FIG. 3 represents the results obtained by application of receive controller 34, classification and assignment module 36, and SAR engine 38 of FIG. 2. As shown in FIG. 3, independent microflows 32A, 32B, 32C have unique VPI/VCI pairs, i.e., VPI/VCI pairs 1, 2, and 3. Three different microflows 32A, 32B, 32C are depicted for purposes of illustration, with the understanding that SAR engine 38 may handle fewer or many more microflows, depending on instantaneous PON requirements. SAR engine 38 segments each unit of information obtained from the microflows 32A, 32B, 32C into a set 53, 55, 57, respectively, of bounded subunits. Each set 53, 55, 57 of bounded subunits is then placed in output queue 40 for transmission over PON optical fiber link 11A. Notably, the subunits in each set 53, 55, 57 are contiguous and are not interleaved with subunits from other microflows 32, facilitating reassembly by SAR engine 38.

Figure 4:
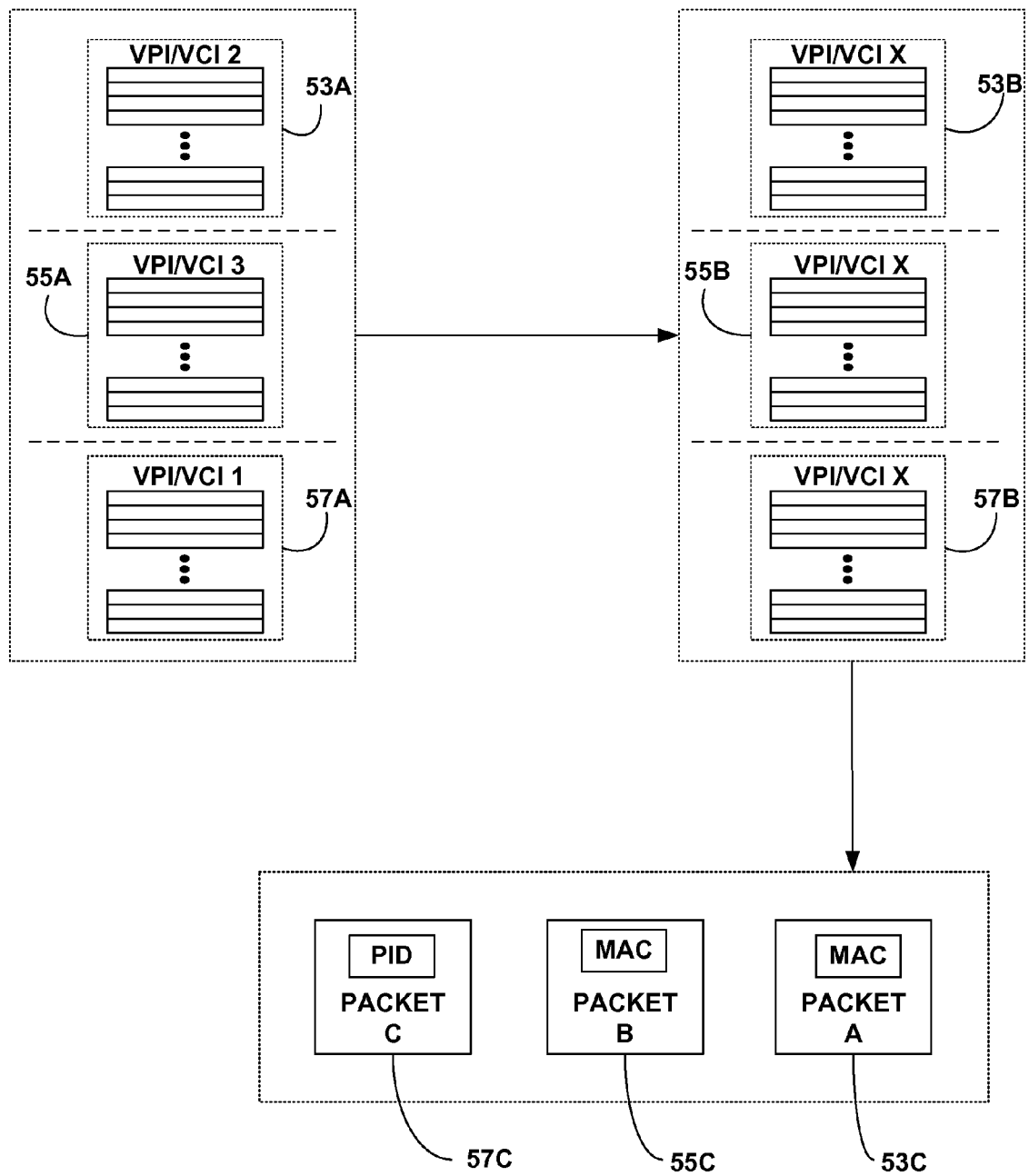
FIG. 4 is a block diagram illustrating a technique for reassembling packets from bounded subunits obtained from a set of merged data flows.

FIG. 4 is a block diagram illustrating a technique for reassembling packets from a bounded subunits obtained from a set of merged data flows. For example, the technique illustrated in FIG. 4 represents the results of application of filter module 44, conversion module 46 and SAR engine 48 of FIG. 2. Upon receipt of each set 53A, 55A, 57A of bounded subunits with particular VPI/VCI combinations identified by filter module 44, conversion module 46 converts the multiple VPI/VCI combinations into a common VPI/VCI combination, producing sets 53B, 55B, 57B of bounded subunits with a common VPI/VCI combination ("VPI/VCI X").

With a common VPI/VCI combination, a single SAR engine 48 is able to reassemble the bounded subunits into pertinent packets, or other information containers. Although the unique VPI/VCI information is lost in the conversion to a common VPI/VCI combination, this original VPI/VCI information is no longer needed following reassembly. Rather, each set 53B, 55B, 57B of bounded subunits is reassembled into a respective packet 53C, 55C, 57C having a high-level identifier, as shown in FIG. 4. For example, each packet 53C, 55C, 57C may have a high-level identifier such as a MAC address or a PID for use by devices 52 (FIG. 2) in determining whether to accept a particular packet, or for use by a router or switch associated with network node 28M in determining whether to send a particular packet to a particular device 52.

Figure 5:
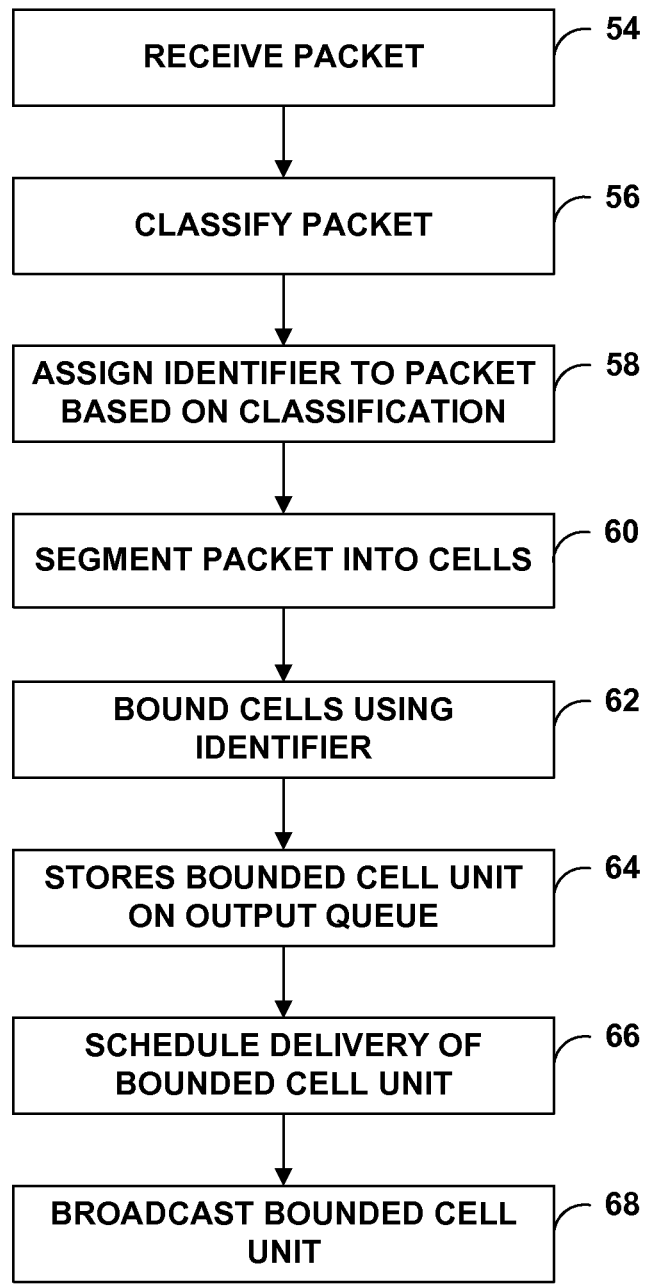
FIG. 5 is a flowchart illustrating operation of an interface module forming part of a PON in accordance with an embodiment of the invention.

FIG. 5 is a flow chart illustrating an example operation of an interface module forming part of a PON. The interface module, such as interface module 30A of FIG. 2, receives information from microflows, e.g., microflows 32, and begins processing the information to form subunits, such as cells. Interface module 30A segments a unit of information into cells and bounds the cells with an identifier to indicate the source, i.e., a particular one of microflows 32, of the unit of information. Upon bounding the cells, interface module 34 broadcasts the bounded cells such that no bounded cell units are interleaved.

As shown in FIG. 5, interface module 30A receives a packet (54) from one or more of microflows 32 and transmits the packet to classification and assignment module 36 (FIG. 2). Classification and assignment module 36 classifies the packet as described above (56). In addition, classification and assignment module 36 assigns an identifier, such as a VPI/VCI combination, to the packet based on the classification (58).

After classifying and assigning an identifier to the packet, SAR engine 38 (FIG. 2) receives the packet and segments the packets into cells (60). SAR engine 38 may conform to standards, such as AAL-5, which specify cell templates and methods for parsing information to fit the templates. For SAR engines included within downstream network nodes, such as network nodes 28A-28M, to reassemble the cells into the original packet, SAR engine 38 bounds the cells associated with the packet by appending the identifier to the front of each cell included within the bounded cell unit (62). SAR engine 38 then stores the bounded cell unit in output queue 40 (64).

Transmit controller 42 monitors output queue 40 for bounded cells and schedules delivery of bounded cell units (66) stored in output queue 40 according to priority, as discussed above. After determining a delivery schedule, transmit controller 42 broadcasts the bounded cell unit (68) downstream to network nodes 28A-28M.

Figure 6:
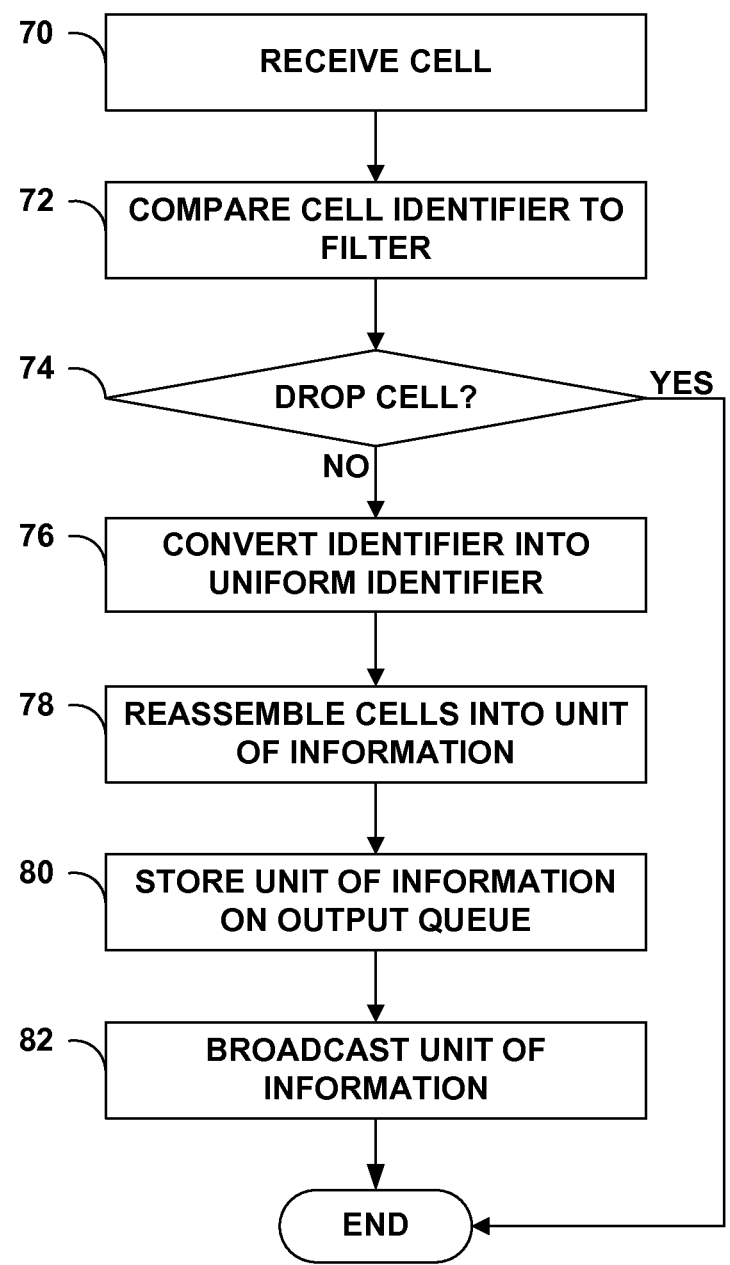
FIG. 6 is a flowchart illustrating operation of a downstream node forming part of a PON in accordance with an embodiment of the invention.

FIG. 6 is a flowchart illustrating an example operation of a downstream network node forming part of a PON. Interface modules and network nodes forming part of a PON may transmit information using cells, which are subunits of information. Each cell may comprise an identifier, a subunit of information (commonly referred to as a "payload"), and a type identifier bit. Furthermore, interface modules and network nodes may conform to methods for segmenting and reassembling the information into cells, such as methods described by AAL-5.

PON 10, as shown in FIG. 2, is an exemplary PON that transmits information in the form of cells using cell-switching technology, such as interface modules 30 and network nodes 28. Network node 28M may, for example, receive a first broadcasted cell (70) of a bounded cell unit from interface module 30A and the identifier of the cell to the identifiers specified by filter module 44 (72). The identifier may include an AAL-5 specified identifier such as a VPI/VCI combination. Network node 28M sets filter module 44 according to requests issued by devices 52, as discussed above. In particular, filter module 44 may include a table, list, indexed list or any other data structure available to store acceptable identifiers, e.g., VPI/VCI combinations. If filter module 44 does not contain the cell identifier, network node 28M drops the cell (74). However, if filter module 44 does include the cell identifier, network node 28M accepts the bounded cell unit and begins processing the cell.

Because multiple identifiers, e.g., VPI/VCI pairs, may bound cells from different microflows, all of which network node 28M may receive, the cell identifier is converted into a uniform identifier (76) by conversion module 46 to enable network node 28M to process cells from multiple microflows with a single SAR engine 48. A single SAR engine is only capable of processing a single microflow as indicated by the identifier. Thus, to allow SAR engine 48 to process cells from multiple microflows, conversion module 46 converts the multiple microflows into a single microflow by merging identifiers associated with the multiple microflows into a uniform identifier. SAR engine 48 may then process cells of multiple microflows, reassembling the cells into the original unit of information (78), because all cells maintain the uniform identifier.

SAR engine 48 proceeds to store the original unit of information on output queue 50 (80). Network node 28M then broadcasts the original unit of information (82), e.g., a packet, to all of devices 52. Devices 52 receive the unit of information and according to a higher-level identifier found within the unit of information, such as a MAC address or program identifier (PID), devices 52 may determine whether to accept the unit of information.

The various components of interface module 30 and network node 28, as described herein, may be realized by appropriate hardware, software, or a combination of hardware and software. Accordingly, the invention may encompass hardware in the form of discrete electronics, or electronics integrated in an ASIC, FPGA, or the like, as well as software and firmware associated with the control, operation and processing of data operations performed within the hardware. The term "module" or "engine," as used herein, may refer to particular functional operations performed within module 30 or network node 28, and contemplates implementation within hardware or software on either an independent, integrated, or even shared basis with other functional modules.

Various embodiments of the invention have been described. However, variations may occur to those skilled in the art. For example, although the invention is described in the context of a PON, the principles and techniques described herein also may be applicable to other types of networks without respect to the particular physical media used to transmit packets, cells or other units of information. Accordingly, the invention should not be considered as limited to optical networks, but may have ready application in wired, e.g., copper, networks and potentially wireless networks. These and other embodiments are within the scope of the following claims.

The invention claimed is:

1. A method comprising:

assigning, in a network interface device, a first identifier to a first unit of information and a second identifier to a second unit of information, wherein the first and second identifiers identify flows associated with the first and second units of information, respectively;

segmenting, in the network interface device, each of the first and second units of information into a plurality of first and second subunits, respectively;

appending, in the network interface device, the first identifier for the first unit of information to the plurality of first subunits, and the second identifier for the second unit of information to the plurality of second subunits; and storing, in the network interface device, the plurality of first and second subunits in a common output queue such that the plurality of first subunits for the first unit of information are not interleaved with the plurality of second subunits for the second unit of information.

2. The method of claim 1, further comprising transmitting the first and second subunits of the first and second units of information stored in the common output queue via a network contiguously such that the plurality of first subunits for the first unit of information are not interleaved with the plurality of second subunits for the second unit of information.

3. The method of claim 2, wherein the network comprises a passive optical network (PON).

4. The method of claim 1, wherein segmenting each of the first and second units of information comprises segmenting each of the first and second units of information using a segmentation and reassembly (SAR) engine.

5. The method of claim 1, wherein segmenting each of the first and second units of information comprises segmenting each of the first and second units of information using a segmentation and reassembly (SAR) engine compliant with ATM Adaptation Layer 5 (AAL 5).

6. The method of claim 1, wherein the first and second units of information each include at least one of an MPEG-2 packet, an IEEE 802.3 Ethernet frame, or an IETF-defined IP packet.

7. The method of claim 1, wherein the plurality of first and second subunits each include ATM cells.

8. The method of claim 1, further comprising transmitting the plurality of first and second subunits of each of the first and second units of information via a passive optical network (PON).

9. An interface device for a network, the interface device comprising:

an assignment module configured to assign a first identifier to a first unit of information and a second identifier to a second unit of information, wherein the first and second identifiers identify flows associated with the first and second units of information, respectively;

a segmentation module configured to segment each of the first and second units of information into a plurality of first and second subunits, respectively, append the first identifier for the first unit of information to the plurality of first subunits, and append the second identifier for the second unit of information to the plurality of second subunits; and an output queue configured to store the plurality of first and second subunits in a common output queue such that the plurality of first subunits for the first unit of information are not interleaved with the plurality of second subunits for the second unit of information, wherein at least one of the assignment module, the segmentation module, and the output queue is implemented at least partially in hardware.

10. The interface device of claim 9, further comprising a transmit controller configured to transmit the first and second subunits of the first and second units of information stored in the common output queue over the network contiguously such that the plurality of first subunits for the first unit of information are not interleaved with the plurality of second subunits for the second unit of information.

11. The interface device of claim 9, wherein the segmentation module comprises a segmentation and reassembly (SAR) engine.

12. The interface device of claim 9, wherein the segmentation module comprises a segmentation and reassembly (SAR) engine compliant with ATM Adaptation Layer 5 (AAL 5).

13. The interface device of claim 9, wherein the first and second units of information each include at least one of an MPEG-2 packet, an IEEE 802.3 Ethernet frame, or an IETF-defined IP packet.

14. The interface device of claim 9, wherein the plurality of first and second subunits each include ATM cells.

15. The interface device of claim 9, further comprising a transmitter coupled to an optical fiber link in a passive optical network (PON) to transmit the plurality of first and second subunits.

16. The interface device of claim 9, wherein the network comprises a passive optical network (PON).

17. A network interface device comprising:

means for assigning a first identifier to a first unit of information and a second identifier to a second unit of information, wherein the first and second identifiers identify flows associated with the first and second units of information, respectively;

means for segmenting each of the first and second units of information into a plurality of first and second subunits, respectively;

means for appending the first identifier for the first unit of information to the plurality of first subunits, and the second identifier for the second unit of information to the plurality of second subunits; and means for storing the plurality of first and second subunits in a common output queue such that the plurality of first subunits for the first unit of information are not interleaved with the plurality of second subunits for the second unit of information, wherein at least one of the means for assigning, segmenting, appending, and storing is implemented at least partially in hardware.

18. The network interface device of claim 17, further comprising means for transmitting the first and second subunits of the first and second units of information stored in the common output queue via a network contiguously such that the plurality of first subunits for the first unit of information are not interleaved with the plurality of second subunits for the second unit of information.

19. The network interface device of claim 17, wherein the means for segmenting each of the first and second units of information comprises means for segmenting each of the first and second units of information using a segmentation and reassembly (SAR) engine.

20. The network interface device of claim 17, wherein the means for segmenting each of the first and second units of information comprises means for segmenting each of the first and second units of information using a segmentation and reassembly (SAR) engine compliant with ATM Adaptation Layer 5 (AAL 5).

21. The network interface device of claim 17, wherein the first and second units of information each include at least one of an MPEG-2 packet, an IEEE 802.3 Ethernet frame, or an IETF-defined IP packet.

22. The network interface device of claim 17, wherein the plurality of first and second subunits each include ATM cells.

23. The network interface device of claim 17, further comprising means coupled to an optical fiber link in a passive optical network (PON) for transmitting the plurality of first and second subunits via the passive optical network (PON).

24. A passive optical network (PON) interface device of a PON, the PON interface device comprising:

an assignment module configured to assign a first identifier to a first unit of information and a second identifier to a second unit of information, wherein the first identifier identifies a first flow associated with the first unit of information, and the second identifier identifies a second flow associated with the second unit of information;

a segmentation module configured to:

segment the first unit of information into a plurality of first subunits, and the second unit of information into a plurality of second subunits; and append the first identifier to the plurality of first subunits, and the second identifier to the plurality of second subunits; and an output queue configured to store the plurality of first and second subunits such that the plurality of first subunits for the first unit of information are not interleaved with the plurality of second subunits for the second unit of information, wherein at least one of the assignment module, the segmentation module, and the output queue is implemented at least partially in hardware.

25. The PON interface device of claim 24, further comprising a transmit controller configured to transmit the first and second subunits of each of the first and second units of information stored in the output queue over the PON network contiguously such that the plurality of first subunits for the first unit of information are not interleaved with the plurality of second subunits for the second unit of information.

26. The PON interface device of claim 24, wherein the segmentation module comprises a segmentation and reassembly (SAR) engine.

27. The PON interface device of claim 24, wherein the segmentation module comprises a segmentation and reassembly (SAR) engine compliant with ATM Adaptation Layer 5 (AAL 5).

28. The PON interface device of claim 24, wherein the first and second units of information each include at least one of an MPEG-2 packet, an IEEE 802.3 Ethernet frame, or an IETF-defined IP packet.

29. The PON interface device of claim 24, wherein and the plurality of first and second subunits each include ATM cells.

30. The PON interface device of claim 24, further comprising a transmitter coupled to an optical fiber link in the PON to transmit the plurality of first and second subunits.

31. A passive optical network (PON) interface device comprising:
- means for assigning a first identifier to a first unit of information and a second identifier to a second unit of information, wherein the first identifier identifies a first flow associated with the first unit of information, and the second identifier identifies a second flow associated with the second unit of information;
- means for segmenting the first unit of information into a plurality of first subunits, and the second unit of information into a plurality of second subunits;
- means for appending the first identifier for the first unit of information to the plurality of first subunits, and the second identifier for the second unit of information to the plurality of second units; and
- means for storing the plurality of first and second subunits in a common output queue such that the plurality of first subunits for the first unit of information are not interleaved with the plurality of second subunits for the second unit of information,
- wherein at least one of the means for assigning, segmenting, appending, and storing is implemented at least partially in hardware.

* * * * *